US009092508B1

(12) United States Patent  
Canty

(10) Patent No.: US 9,092,508 B1
(45) Date of Patent: Jul. 28, 2015

(54) OVERSEEING DATA STORAGE EQUIPMENT POWER USAGE VIA LOCAL COLLECTION OF POWER CONSUMPTION DATA AND REMOTE EVALUATION AND REPORTING OF PERFORMANCE

(71) Applicant: EMC Corporation, Hopkinton, MA (US)

(72) Inventor: Denis Canty, Macroom (IE)

(73) Assignee: EMC Corporation, Hopkinton, MA (US)

( * ) Notice: Subject to any disclaimer, the term of this patent is extended or adjusted under 35 U.S.C. 154(b) by 275 days.

(21) Appl. No.: 13/768,163

(22) Filed: Feb. 15, 2013

(51) Int. Cl.
G06F 11/34 (2006.01)
G06F 11/30 (2006.01)
G06F 1/32 (2006.01)

(52) U.S. Cl.
CPC .......... *G06F 11/3062* (2013.01); *G06F 1/3221* (2013.01)

(58) Field of Classification Search
CPC G06F 1/3221; G06F 11/3006; G06F 11/3062
USPC .................................................. 713/300, 340
See application file for complete search history.

(56) References Cited

U.S. PATENT DOCUMENTS

| 6,411,535 | B1 | 6/2002 | Roux |
| 8,112,586 | B1 | 2/2012 | Reiner et al. |
| 8,130,554 | B1 | 3/2012 | Linnell |
| 8,166,315 | B1 | 4/2012 | Wambach et al. |
| 8,239,617 | B1 | 8/2012 | Linnell |
| 8,285,302 | B1 | 10/2012 | Espy et al. |
| 8,285,967 | B1 | 10/2012 | Veeraswamy et al. |
| 8,378,786 | B2 | 2/2013 | Bailey et al. |
| 8,429,307 | B1 | 4/2013 | Faibish et al. |
| 8,489,816 | B1 | 7/2013 | Reiner et al. |
| 8,645,654 | B1 | 2/2014 | Bailey et al. |
| 8,756,441 | B1 * | 6/2014 | Mullins et al. ................ 713/300 |
| 8,762,583 | B1 | 6/2014 | Faibish et al. |
| 8,838,887 | B1 | 9/2014 | Burke et al. |
| 8,880,682 | B2 | 11/2014 | Bishop et al. |
| 8,935,493 | B1 | 1/2015 | Dolan et al. |
| 8,966,293 | B1 | 2/2015 | Dutch et al. |
| 2011/0016342 | A1 * | 1/2011 | Rowan et al. ................ 713/340 |
| 2011/0239013 | A1 * | 9/2011 | Muller ......................... 713/320 |
| 2012/0011378 | A1 * | 1/2012 | Dalton et al. ................ 713/300 |

* cited by examiner

*Primary Examiner* — Albert Wang
(74) *Attorney, Agent, or Firm* — BainwoodHuang

(57) ABSTRACT

A technique oversees data storage equipment power usage. The technique involves acquiring, by data storage equipment, power consumption data while the data storage equipment performs host data storage input/output (IO) operations on behalf of a set of host computers during a power consumption time period. The technique further involves storing, by the data storage equipment, the power consumption data in a local database during the power consumption time period. The technique further involves electronically providing, by the data storage equipment, the power consumption data from the local database to a remote power consumption analysis facility through a computerized communications medium to determine power consumption performance of the data storage equipment during the power consumption time period. Such operation alleviates the user from having to manually take measurements and perform calculations which would be burdensome and error prone.

20 Claims, 4 Drawing Sheets

OVERSEEING DATA STORAGE EQUIPMENT POWER USAGE VIA LOCAL COLLECTION OF POWER CONSUMPTION DATA AND REMOTE EVALUATION AND REPORTING OF PERFORMANCE

BACKGROUND

A conventional approach to assessing power usage of a data storage array involves manually monitoring an external meter which feeds electricity (i.e., street power) to the power supply units of the data storage array. Along these lines, an operator of the data storage array may take readings from this external electricity meter before and after a period of use (e.g., several days, a month, etc.) to determine how many megawatts hours (MWHs) are used by the data storage array over that period of use.

If the cost of a megawatt hour is known, then the overall cost of electricity needed to operate the data storage array can be calculated. As a result, the operator may be able to estimate the overall cost of electricity which is required to operate the data storage array over a period of time in the future.

SUMMARY

Unfortunately, there are deficiencies and limitations in the above-described conventional approach of manually monitoring external electricity meters to assess power usage of data storage arrays. In particular, there may be multiple data storage arrays and perhaps other computerized devices (e.g., host devices, networking hardware, consoles, etc.) consuming power through the same external electricity meter. As a result, the actual power usage of the data storage array cannot be discerned from the overall readings of this common external electricity meter.

Additionally, there is no direct mechanism to determine whether the data storage array uses power efficiently or inefficiently. For example, suppose that the operator takes the number megawatts hours used during a particular period of time from external electricity meter readings, and performs a set of calculations to determine a particular data storage array's power performance. Unfortunately, there is no direct way to determine whether this calculated power performance is good or bad because system power consumption depends on a hybrid mesh of interactions between software and hardware components. Along these lines, a result that superficially appears to be good power performance could be due to smartly transitioning one or more portions of an inefficient data storage array to a low power or sleep mode during times of inactivity (e.g., spinning down disk drives, deactivating one or more processors, etc.). Likewise, a result that superficially appears to be poor power performance could be due to running a very efficient data storage array constantly at full capacity (i.e., in a sustained manner at maximum throughput, with full functionality, etc.). Accordingly, for the operator to have any worthy insight, the operator would need to thoroughly understand the actual operating schedule of the data storage array, and then manually factor that actual operating schedule into the set of calculations. Such a manual endeavor is burdensome as well as error prone.

Furthermore, there is currently no standard methodology for someone to conveniently discover changes or trends in power usage performance and accurately attribute those changes/trends to their associated causes. For example, if there is a measured change in power usage, there is no simple way of correlating that change to a particular factor or factors such as a modification in the data storage software, changes in the active/sleep schedule, changes in user traffic/throughput, and so on. Nevertheless, it would be helpful for the operator to know whether a particular change in operating pattern would cause a significant change in power usage. Additionally, it would be helpful for a software developer to know whether a particular change in a software application would cause a significant change in power usage. Also, it would be helpful for a salesperson or a potential purchaser to be able to quantify with higher accuracy how much savings in the cost of electricity there would be if an existing data storage array is replaced with a new data storage array. Regrettably, such information is difficult to uncover using the above-described conventional approaches of manually monitoring external electricity meters to assess power usage of data storage arrays.

In contrast to the above-described conventional approaches, improved techniques are directed to overseeing data storage equipment power usage by locally collecting and storing power consumption data, and sending that power consumption data to a remote facility for power consumption evaluation. Collection of such power consumption data may involve electronically taking measurements from a variety of data storage components (e.g., specialized power supply sensors, microprocessor states, and so on). Additionally, such operation can be performed routinely and in an automated manner to unburden the user. Furthermore, evaluation of the power consumption data can be performed centrally at the remote facility in a manner that enables meaningful equipment/operating-pattern comparisons to be drawn among multiple data storage arrays residing at different locations. Moreover, evaluation at the remote facility frees the data storage equipment from the need to locally consume power and processing cycles to perform the evaluation.

One embodiment is directed to a method of overseeing data storage equipment power usage. The method includes acquiring, by data storage equipment, power consumption data while the data storage equipment performs host data storage input/output (IO) operations on behalf of a set of host computers during a power consumption time period. The method further includes storing, by the data storage equipment, the power consumption data in a local database during the power consumption time period. The method further includes electronically providing, by the data storage equipment, the power consumption data from the local database to a remote power consumption analysis facility (e.g., a central data center) through a computerized communications medium (e.g., over a public network) to determine power consumption performance of the data storage equipment during the power consumption time period. Such operation alleviates the user from having to manually take measurements and perform calculations which is burdensome and error prone.

In some arrangements, the data storage equipment is constructed and arranged to log storage drive error events while performing the host data storage IO operations (e.g., SCSI commands) on behalf of the set of host computers. In these arrangements, the data storage equipment is capable of bundling the power consumption data and the storage drive error events into an aggregate data storage equipment performance package and sending the aggregate data storage equipment performance package to a remote data storage equipment support center for evaluation. The bundling of such information into a package enables, among other things, effective data compression for less bandwidth consumption (e.g., all of the data bundled into a single communication), and improved collection and organization of information by the remote facility.

It should be understood that acquiring the power consumption data may involve accessing a variety of internal components of the data storage equipment in order to obtain precise measurements that are not significantly influenced by other factors. Examples of such power consumption data includes power supply measurements from power supply sensors of a set of power supplies of the data storage equipment, C-state data describing C-state power mode history of a set of central processing units (CPUs) of the data storage equipment, utilities which monitor levels of host input/output (host IO) traffic and throughput related statistics, and so on.

It should be further understood that the remote power consumption analysis facility can receive the power consumption data over a computerized network and process that data to provide a set of power consumption results. The remote facility can then store the set of power consumption results in a power consumption repository (e.g., a database containing similar data and results for other data storage equipment installations). The results are then available for use in generating useful reports such as customer reports including change-of-operation recommendations to reduce power consumption, software developer reports including energy usage results corresponding to particular software applications for development of "greener" applications, sales/marketing reports including power consumption comparisons among alternative data storage equipment products to determine whether to replace legacy equipment with more efficient equipment, and so on.

Moreover, it should be understood that the above-described method can be repeated and maintained over time, e.g., periodically, so that subsequent data and results can be compared to past data and results. For example, a series of power consumption results stored in the power consumption repository may easily identify trends or activities that cause efficient or inefficient power consumption performance.

Additionally, it should be understood that with such local power consumption data collection, the power consumption results can include array-specific power consumption information even if multiple data storage arrays are fed electricity through the same external electricity meter. That is, even when multiple data storage arrays reside at a single data storage equipment installation site, the above-described method provides power consumption results with array-level granularity since the data is collected locally by each array.

It should be further understood that there are no restrictions to the location of the remote power consumption analysis facility. Rather, from the perspective of the data storage equipment, the power consumption analysis facility essentially resides in "the cloud". In this cloud context, the electronic circuitry of the remote facility may be formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in overseeing data storage equipment power usage.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to overseeing data storage equipment power usage by locally collecting power consumption data by the data storage equipment, and then sending that power consumption data to a remote facility for power consumption evaluation. Such collection of this power consumption data may involve electronically taking measurements from a variety of data storage components (e.g., specialized power supply sensors, microprocessor states, and so on). Additionally, such operation can be performed routinely and in an automated manner to unburden the user. Furthermore, evaluation can be performed centrally at the remote facility in a manner that enables meaningful equipment/operating-pattern comparisons to be drawn among multiple data storage arrays at different locations. Moreover, such evaluation at the remote facility frees the data storage equipment from the need to locally consume power and processing cycles to perform the evaluation.

Figure 1:
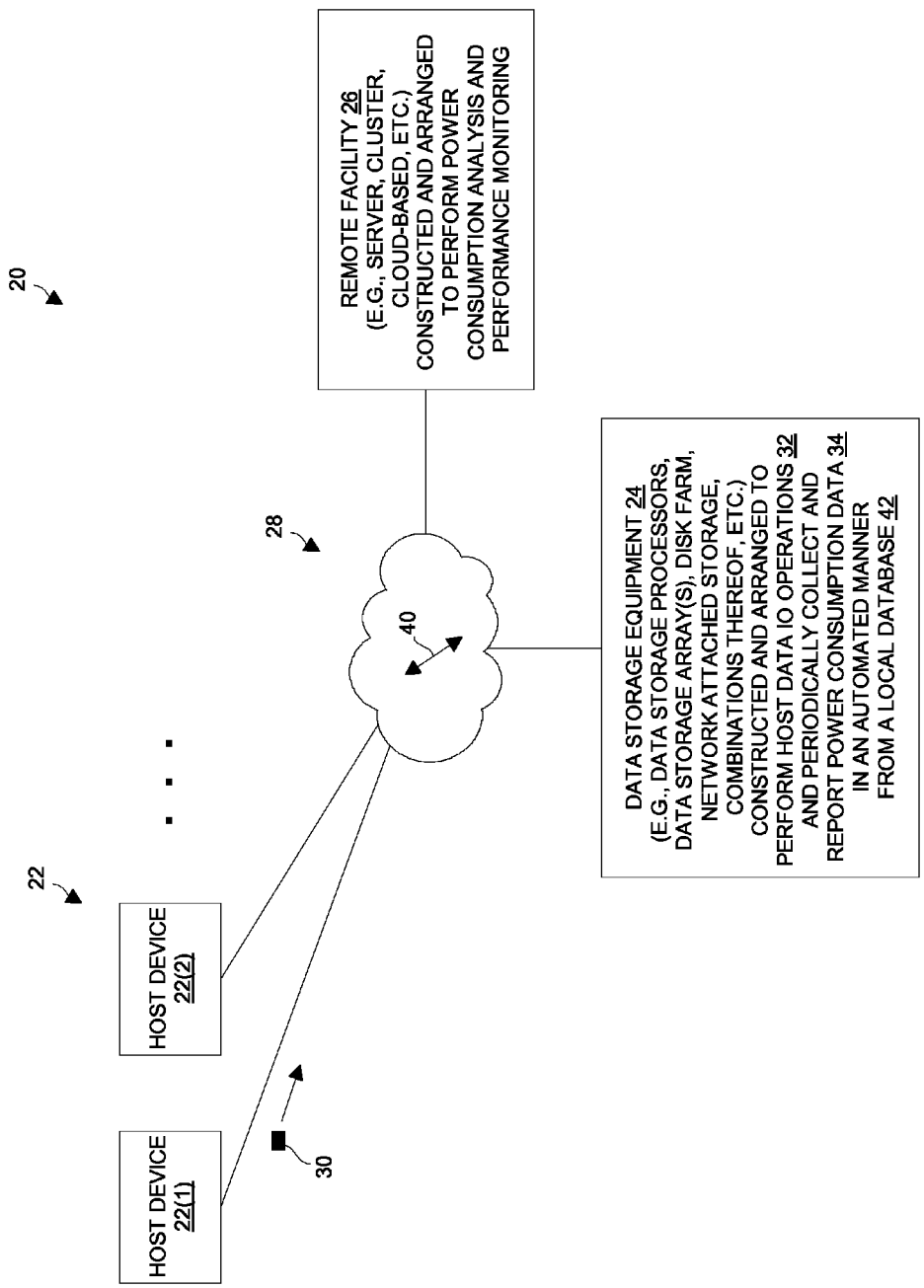
FIG. 1 is a block diagram of an electronic environment which is suitable for overseeing data storage equipment power usage in accordance with the current disclosure.

FIG. 1 is a block diagram of an electronic environment 20 which is suitable for overseeing data storage equipment power usage. The electronic environment 20 includes host devices 22(1), 22(2), . . . (collectively, host devices 22), data storage equipment 24, remote facility 26, and communications medium 28.

The host devices 22 are constructed and arranged to send host input/output (IO) requests 30 to the data storage equipment 24 to store host data into and load host data from the data storage equipment 24. Examples of suitable host IO requests 30 include SCSI commands, iSCSI commands, file-based data access commands, and so on.

The data storage equipment 24 is constructed and arranged to perform host data IO operations 32 in response to the host IO requests 30. The data storage equipment 24 is further constructed and arranged to periodically collect and report power consumption data 34 to the remote facility 26 in an automated manner while performing the host data IO operations 32. Examples of apparatus which are suitable for the data storage equipment 24 include data storage assemblies, storage processors, data storage arrays, disk farms, network attached storage devices, combinations thereof, and various data storage components which are involved in storing data on behalf of a set of host devices 22.

The remote facility 26 is constructed and arranged to perform power consumption analysis on the power consumption data 34. In some arrangements, the remote facility 26 is further constructed and arranged to monitor and report other operating aspects of the data storage equipment 24 as well, e.g., evaluate storage errors, monitor disk drive health, etc. In these arrangements, the power consumption data 34 and other operating data can be bundled together in a common electronic transmission for, among other things, organization and control efficiencies. Along these lines, the remote facility 26 may be in the form of a server, a cluster of devices, cloud-based, and so on.

The communications medium 28 is constructed and arranged to connect the various components of the electronic environment 20 together to enable these components to exchange electronic signals 40 (e.g., see the double arrow 40). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, the data storage equipment 24 acquires power consumption data 34 while performing the host data IO operations 32 on behalf of a set of host devices 22 during a power consumption time period (e.g., a full day of operation). The data storage equipment 24 stores the power consumption data 34 in a local database 42 during the power consumption time period.

Next, the data storage equipment 24 sends the power consumption data 34 from the local database 42 to the remote facility 26 through the communications medium 28. The remote facility 26 then evaluates the power consumption data 34 to determine the power consumption performance of the data storage equipment 24 during the power consumption time period. With the results of such evaluation available, the operator of the data storage equipment 24 as well as other entities (e.g., software developers, salespeople, potential customers, etc.) benefit from the ability to compare and control future operation based on the results. Further details will now be provided with reference to FIG. 2.

Figure 2:
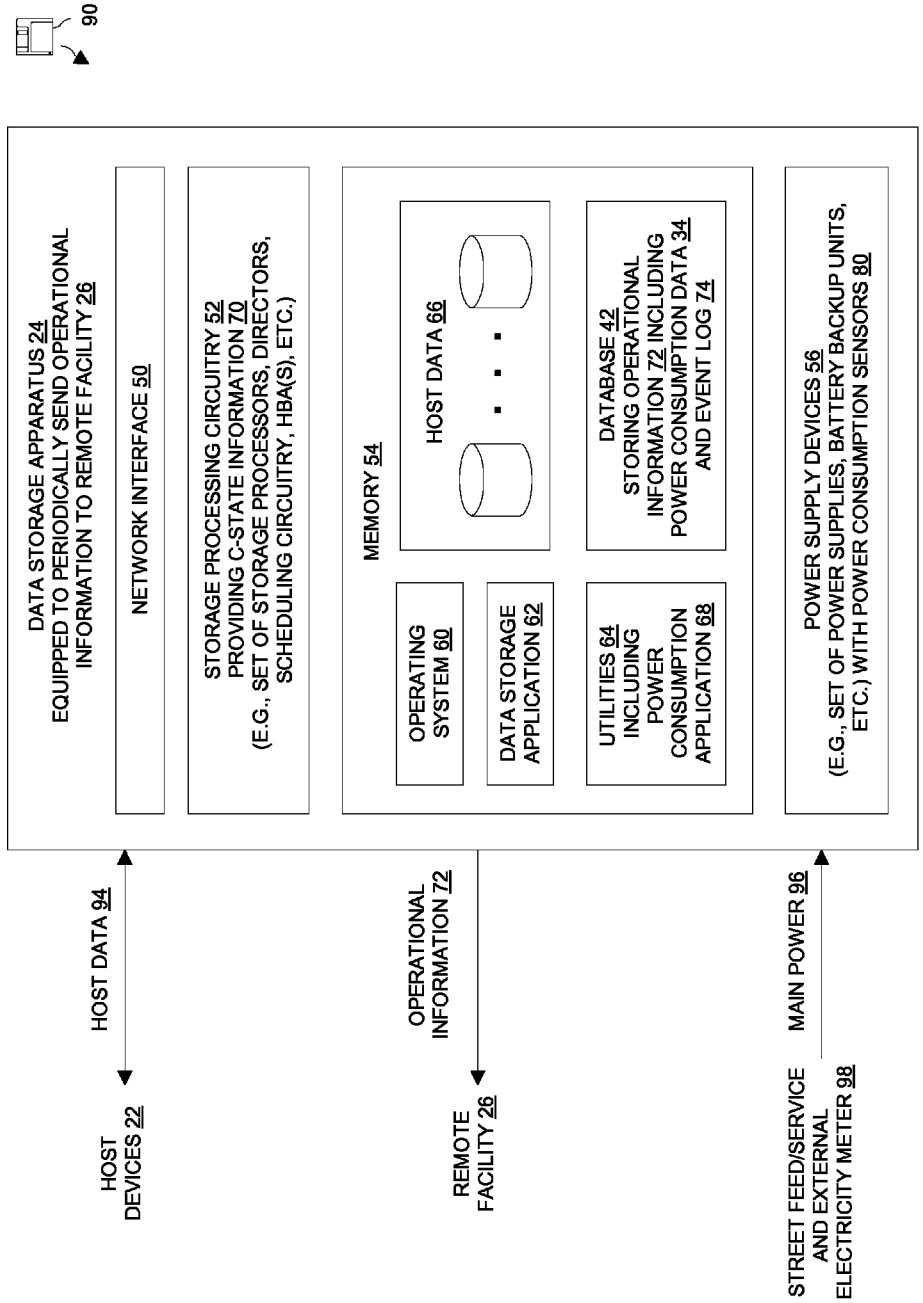
FIG. 2 is a block diagram of data storage equipment which is constructed and arranged to collect and provide power consumption data while the data storage equipment performs host data storage input/output (IO) operations on behalf of a set of host computers during a power consumption time period.

FIG. 2 is a block diagram of the data storage equipment 24 of the electronic environment 20 (also see FIG. 1). The data storage equipment 24 includes, among other things, a network interface 50, storage processing circuitry 52, memory 54, and power supply devices 56. Although the data storage equipment 24 is illustrated in FIG. 2 as having components which are tightly coupled, it should be understood that one or more of these data storage components may be disposed in a distributed manner (e.g., in a separate equipment cabinet or assembly, on a separate circuit board, etc.).

The network interface 50 is constructed and arranged to connect the data storage equipment 24 to the communications medium 28 (FIG. 1). Accordingly, the network interface 50 enables the data storage equipment 24 to communicate with the other components of the electronic environment 20. Such electronic communications may be copper-based or wireless (i.e., IP-based, SAN-based, cellular, Bluetooth, combinations thereof, and so on).

The storage processing circuitry 52 is constructed and arranged to operate in accordance with various software constructs stored in the memory 66. Along these lines, such circuitry 52 may be implemented in a variety of ways including via one or more processors (or cores) running specialized software, application specific ICs (ASICs), field programmable gate arrays (FPGAs) and associated programs, discrete components, analog circuits, other hardware circuitry, scheduling circuitry or timer circuits, host bus adapters (HBAs), and so on. In some arrangements, the storage processing circuitry 52 includes multiple storage processors or directors (e.g., blades) for fault tolerance and load balancing.

The memory 54 is intended to represent both volatile storage (e.g., DRAM, SRAM, etc.) and non-volatile storage (e.g., flash memory, magnetic disk drives, etc.). The memory 54 stores a variety of software constructs including an operating system 60, a data storage application 62, utilities 64, host data 66 and the database 42. The operating system 60 provides resource management. The data storage application 62 (which in some arrangements may be integrated with the operating system 60) performs the host IO operations 32 to provide the host devices 22 with access to the host data 66. The utilities 64 include a power consumption application 68 which includes instructions that direct the storage processing circuitry 52 to collect power consumption data 34 from various components of the data storage equipment 24 while the data storage equipment 24 performs the host IO operations 32 during the power consumption time period. Such data 34 may include C-state information 70 (e.g., microprocessor states and associated timestamps, which storage devices are active or in sleep mode, current hardware configuration (e.g., model numbers, version numbers, etc.), current software configuration (e.g., version numbers, which releases/updates are running, utility schedule, whether batteries are being tested/charged, etc.), and so on. The database 42 is constructed and arranged to store operational information 72 including the power consumption data 34 as well as other data such as an event log 74 describing the host IO operations 32 (e.g., drive errors, path errors, online/offline events, etc.).

The power supply devices 56 are provisioned with power consumption sensors 80 to collect at least some of the power consumption data 34. For example, the sensors 80 may measure or sample current levels and/or voltage levels routinely over the course of operation. The sensors 80 may also collect other power-related data such as operating temperature, loading (i.e., which devices are active), fan speeds, current throughput, current traffic levels, etc.

It should be understood that, in the context of one or more processors executing software, a computer program product 90 is capable of delivering all or portions of the software to the data storage equipment 24. The computer program product 90 has a non-transitory (or non-volatile) computer readable medium which stores a set of instructions which controls one or more operations of the data storage equipment 24. Examples of suitable computer readable storage media include tangible articles of manufacture and apparatus which store instructions in a non-volatile manner such as CD-ROM, flash memory, disk memory, tape memory, and the like.

It should be further understood that the data storage equipment 24 may include additional and other components as well. For example, the data storage equipment 24 may include a console or user interface which is constructed and arranged to receive input from a user and provide output to the user, etc.

During operation, the data storage equipment 24 receives host data 94 from and provides host data 94 to the host devices 22 (see the double arrow in FIG. 2). Additionally, the data storage equipment 24 collects and periodically sends the operating information 72 to the remote facility 26 for evaluation (e.g., a transmission of the operating information 72 once a day to the remote facility 26 for processing). Furthermore, the data storage equipment 24 consumes main power 96 from a street feed/service and external electricity meter 98.

It should be appreciated that, although the external electricity meter 98 may provide some insight as to the power consumption pattern of the data storage equipment 24, such insight is limited (e.g., due to poor granularity, lack of control/ understanding, etc.). In particular, other equipment connected to the external electricity meter 98 may skew or corrupt the ability of the data from the external electricity meter 98 to identify power consumption efficiency of the data storage equipment 24. Moreover, there is no convenient mechanism that enables the operator to easily correlate readings from the external electricity meter 98 with any operating schedule or events of the data storage equipment 24. Further details will now be provided with reference to FIG. 3.

Figure 3:
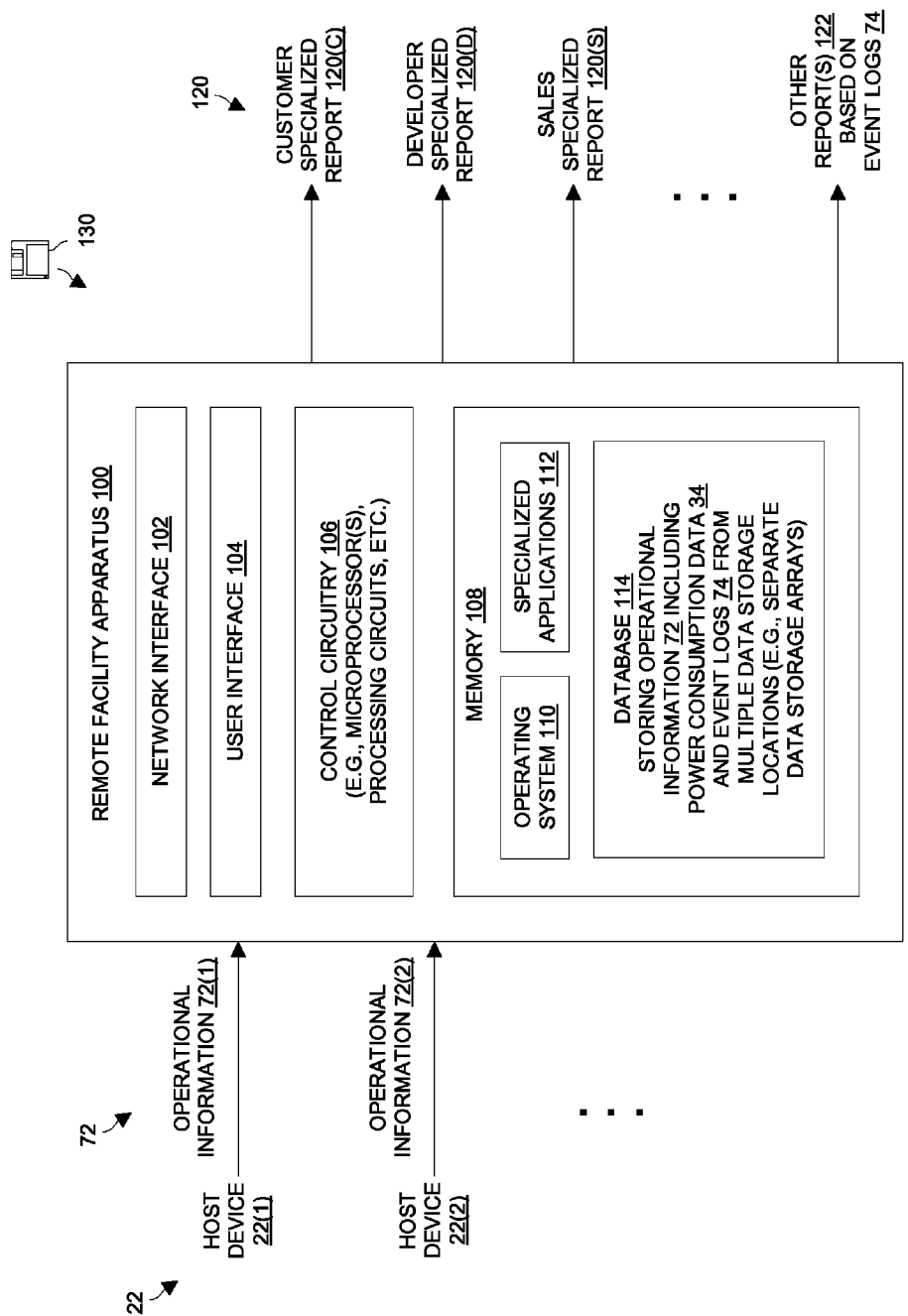
FIG. 3 is a block diagram of a remote facility apparatus which receives the power consumption data to determine power consumption performance of the data storage equipment.

FIG. 3 is a block diagram of a remote facility apparatus 100 which is suitable for use as the remote facility 26 or a portion thereof (also see FIG. 1). In particular, the remote facility apparatus 100 receives the power consumption data 34 from the data storage equipment 24 to determine power consumption performance of the data storage equipment 24. In some arrangements, the remote facility apparatus 100 receives power consumption data 34 from multiple data storage equipment locations thus operating as a central repository to oversee power consumption performance at multiple locations. As shown in FIG. 3, the remote facility apparatus 100 includes, among other things, a network interface 102, a user interface 104, control circuitry 106, and memory 108.

The network interface 102 is constructed and arranged to connect the remote facility apparatus 100 to the communications medium 28 (FIG. 1). Accordingly, the network interface 102 enables the remote facility apparatus 100 to communicate with the other components of the electronic environment 20. Such electronic communications may be copper-based or wireless (i.e., IP-based, SAN-based, cellular, Bluetooth, combinations thereof, and so on).

The user interface 104 is constructed and arranged to receive input from one or more users and provide output to the one or more users. In some arrangements, the user interface may take the form of a set of consoles, terminals, and/or user/client workstations each having a standard keyboard, pointing device (e.g., mouse) and display.

The control circuitry 106 is constructed and arranged to operate in accordance with various software constructs stored in the memory 108. Along these lines, such control circuitry 106 may be implemented in a variety of ways including via one or more processors (or cores) running specialized software, application specific ICs (ASICs), field programmable gate arrays (FPGAs) and associated programs, and so on. In some arrangements, the control circuitry 106 includes multiple microprocessors for fault tolerance and load balancing.

The memory 108 is intended to represent both volatile storage (e.g., DRAM, SRAM, etc.) and non-volatile storage (e.g., flash memory, magnetic disk drives, etc.). The memory 108 stores a variety of software constructs including an operating system 110, specialized applications 112, and a database 114. The operating system 110 provides resource management. The specialized applications 112 receive the operational information 72(1), 72(2), . . . (collectively operational information 72) from respective host devices 22 and store the operational information 72 in the database 114.

The specialized applications 112 further retrieve the operational information 72 from the database 114 and the operational information 72 to generate useful power consumption reports 120. In particular, the specialized applications 112 process the power consumption data 34 to generate specialized power consumption reports 120(C) for data storage equipment operators or customers, e.g., recommendations to modify operation such as change certain energy management settings. Likewise, the specialized applications 112 process the power consumption data 34 to generate specialized power consumption reports 120(D) for developers, e.g., to improve energy usage, to lead to "greener" software, to increase software value to customers, etc. Furthermore, the specialized applications 112 process the power consumption data 34 to generate specialized power consumption reports 120(S) for salespeople to push for "greener" technologies, e.g., solid state drives vs. hard disk drives, etc. Unlike metrics derived from conventional external meter readings, the information in these power consumption reports 120 provides precise performance results which are specific to particular data storage equipment 24, i.e., fine granularity.

Additionally, the specialized applications 112 may generate other reports 122 based on the event logs 74 within the operational information 72. Such reports 122 may recommend replacement of various storage units (e.g., disk drives, flash drives, etc.), upgrading versions of software, and so on.

The combination of reports 120, 122 may lead data storage equipment operators to make bolder power consumption decisions. In particular, the operator may make significant changes to the software execution, schedules, traffic patterns, etc. For example, the results, may recommend changing of certain system settings, highlight inefficient data center elements, and suggest moving certain software execution such as backups and archiving to various times at night for cost savings. Additionally, operators may retire or power cap certain data storage equipment 24 based on the results and recommendations, and so on.

It should be understood that, in the context of one or more processors executing software, a computer program product 130 is capable of delivering all or portions of the software to the remote facility apparatus 100. The computer program product 130 has a non-transitory (or non-volatile) computer readable medium which stores a set of instructions which controls one or more operations of the remote facility apparatus 100. Examples of suitable computer readable storage media include tangible articles of manufacture and apparatus which store instructions in a non-volatile manner such as CD-ROM, flash memory, disk memory, tape memory, and the like.

One will appreciate that performing power consumption analytics at the remote facility apparatus 100 removes the burden from the data storage equipment 24. It should be understood that the remote facility apparatus 100 is illustrated in FIG. 3 as having components which are tightly coupled by way of example only. In other arrangements, one or more of these components may be disposed in a distributed manner (e.g., in a distributed manner, within a server farm or cluster of devices, in the cloud, etc.).

It should be appreciated that there are particular advantages to the electronic environment 20 described above in connection with FIGS. 1-3. For example, the specialized power consumption reports 120 provide performance results which are more precise than what would be derived from a conventional approach of manually monitoring external electricity meters. In particular, the power consumption reports 120 are able to deliver specific power consumption results for specific data storage equipment 24 since such results are based on the power consumption data 34, i.e., local measurements and data which are specific to the particular data storage equipment 24. Along these lines, recall that the power consumption data 34 is collected internally, e.g., see the local power consumption sensors 80 in the power supply devices 56 and the C-state information 70 from the storage processing circuitry 52 in FIG. 2. Additionally, since the power consumption data 34 includes operating pattern data, such results may be further based on schedules of drives being spun up or down, recorded throughput, and so on. Accordingly, it is difficult or impossible to unintentionally skew or distort the results as would be the case if the results relied exclusively on readings from external electricity meters which could also supply power to other machines.

One should appreciate that, in connection with C-states, there may be a variety of power states or modes (e.g., "C-modes") available for selection by the operator. In particular, placing all or parts of the CPU into certain modes at certain times of the day may enable the data storage equipment 24 to consume less power during the course of the time period (e.g., one day). Such changes in C-state (e.g., changing among modes C1, C2, C3, C4, and so on) may cut clock frequency, reduce voltage, shut down circuits, and so on to improve power consumption performance.

Furthermore, since the power consumption data 34 is collected from a variety of internal sources, it is now possible to identify whether the power performance is good or bad. That is, power consumption influences such as running the data storage equipment in a low power or sleep mode or constantly at full capacity would be automatically identified from the power consumption data 34. Moreover, such power performance is capable of being objectively compared to similar and different equipment installations to improve power consumption understanding and root cause analysis of certain variations, locations, etc.

Also, the above-described system provides a standard methodology to conveniently discover changes or trends in power usage performance and accurately attribute those changes/trends to their associated causes. For example, changes in power usage may be correlated to particular factors such as a modification in the data storage software, changes in the active/sleep schedule, changes in user traffic/throughput, and so on. Such information is then available to a variety of people involved in influencing changes in the electronic environment 20. For example, with such automated operation, the operator of the data storage equipment 24 receives precise results in order to find and attend to operating inefficiencies. As another example, software design is able to consider carbon impact when developing data storage software. As yet another example, potential customers considering purchasing, upgrading or replacing data storage equipment 24 have better information to factor into their decision making efforts.

EXAMPLES

Two examples will now be described for further illustration. It is understood that these examples are intended to illustrate various features and principles, and that the improved techniques hereof are broader than the specific examples disclosed.

Example 1

To the Customer

Suppose that execution of a particular data storage software application (e.g., a utility, a tool, etc.) on a data storage server rack and takes one hour to complete. Further suppose that all CPUs are in active C-state 0 by default. Further suppose that the data storage software application is written to utilize a single CPU, and that the storage processing circuitry within the data storage server rack contains four cores (e.g., four mobile Core 2 Duo T9400 or T9600, etc.), which have a maximum current consumption of 47 Amps.

In this situation, the total consumption for four CPUs would be 188 Amps. Moreover, three of the four CPU's run idle during the hour of the software execution.

However, with internal collection and reporting of the power consumption data 34 by the data storage equipment, and evaluation of that power consumption data 34 by the remote facility apparatus 100, such monitoring and analytics easily uncovers this situation. Accordingly, three CPUs could then be put into C-state 6 mode to drop the maximum current consumption to 5.7 Amps once the CPUs are under C-state 6 mode. As a result, the data storage equipment is then able to enjoy an impressive 87.87% decrease in power consumption. In particular, the total consumption for the CPUs is now 64.1 Amps.

Example 2

To the Software Development Team

Suppose that execution of a particular data storage software application (e.g., a utility, a tool, etc.) on a data storage server rack and takes one hour to complete. Further suppose that the data storage software application is written to utilize up to a maximum of eight threads per CPU, on a dual CPU system. In particular, suppose that the software algorithm is written so that if the software sees only one CPU, it utilizes eight threads. However, once it sees a second CPU, it utilizes eight threads on this device. These events lead to two CPUs running in C-state 0.

Now, suppose that a new data storage platform has two faster CPUs with 20 threads available on each CPU. Here, both CPUs would still operate in C-state 0 with the same utilization if no modifications were made. In particular, in this situation, the two CPUs would run even though there are enough threads on a single CPU of the new platform to resource the application.

Fortunately, with internal collection and reporting of the power consumption data 34 by the data storage equipment, and evaluation of that power consumption data 34 by the remote facility apparatus 100, such monitoring and analytics easily uncovers this situation. In turn, the feedback is given in the form of a report or set of recommendations to the software development team, and the developer is then able to increase the thread utilization per CPU from 8 to 16. As a result, it is then possible to plunge the CPU into a lower C-state (e.g., C-state 4) to reduce power consumption but nevertheless enable the data storage software application to operate properly and efficiently.

Further Details

Figure 4:
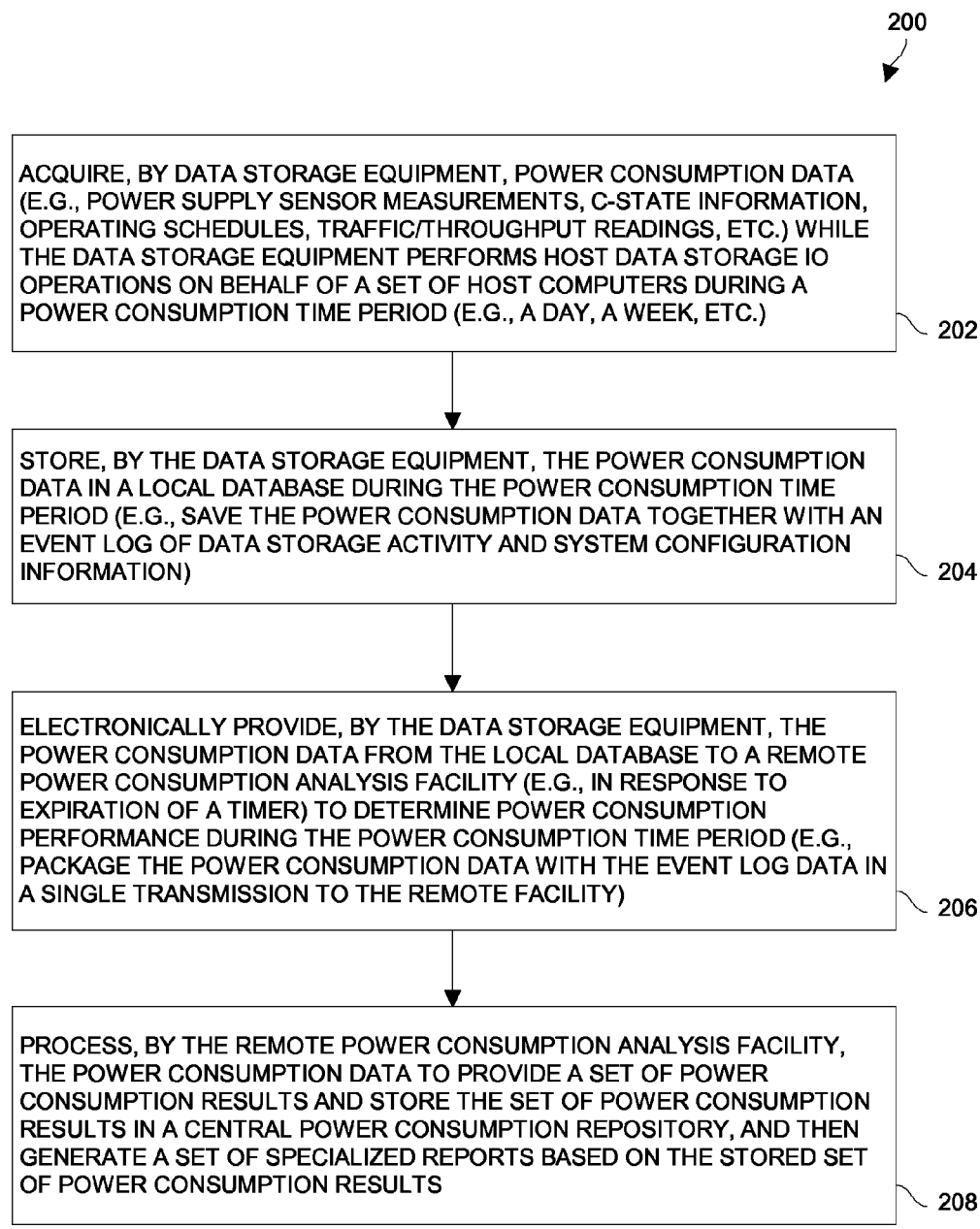
FIG. 4 is a flowchart of a procedure which is performed by the electronic environment of FIG. 1.

Further details will now be provided with reference to FIG. 4. FIG. 4 is a flowchart of a procedure 200 which is performed by the electronic environment 20 to oversee data storage equipment power usage.

In step 202, the data storage equipment 24 acquires power consumption data 34 while the data storage equipment 24 performs host data storage IO operations 32 on behalf of a set of host computers 22 during a power consumption time period. In some arrangements, the time period is a contiguous 24 hour window of operation.

In step 204, the data storage equipment 24 stores the power consumption data 34 in a local database 42 during the power consumption time period. In some arrangements, the power consumption time period is controlled by a timer or scheduler circuit (e.g., see the storage processing circuitry 52 of FIG. 2). In these arrangements, the data storage equipment 24 continues to collect power consumption data 34 until the timer provides a power consumption time period expiration signal (e.g., daily, etc.).

In step 206, at the end of the power consumption time period, the data storage equipment 24 electronically provides the power consumption data 34 from the local database 42 to a remote power consumption analysis facility (see the remote facility apparatus 100 in FIG. 3 and the remote facility 26 in FIG. 1) through the computerized communications medium 28 to determine power consumption performance of the data storage equipment 24 during the power consumption time period. Such a transmission may include event log data packaged into a single bundle which is sent to the remote facility 26 (FIG. 1) for evaluation. Furthermore, at the completion of the power consumption time period, the data storage equipment 24 may begin collection of more power consumption data 34 for the next power consumption time period, and so on.

In step 208, the remote power consumption analysis facility processes the power consumption data 34 to provide a set of power consumption results and storing the set of power consumption results in a power consumption repository 114. The remote power consumption analysis facility then generates a set of specialized reports 120 based on the power consumption results. Such reports are useful in achieving more efficient and environmentally friendly (e.g., "greener") operation in the future.

In some arrangements, the current results may be compared to previous results for the same data storage equipment 24 to find causes of power savings and to fine tune operation over time. In particular, the remote power consumption analysis facility may collect a series of results and thus enable the operator to see power consumption changes in response to changes in system settings.

In some arrangements, the results may be compared to similar installations at other locations (e.g., among different storage arrays). Accordingly, activities that result in good power consumption performance at one location can be share with the other similar locations in the form of recommendations/suggestions.

In some arrangements, the data storage products themselves manage a certain proportion of their energy management behavior in an automated manner. For example, in some arrangements, the remote facility apparatus 100 sends the power consumption performance results back to the data storage apparatus 24 as feedback or input. When the data storage apparatus 24 receives the power consumption performance results from the remote facility apparatus 100, the data storage apparatus 24 automatically adjusts its local energy management settings based on the results.

It should be understood that, under an arrangement in which the data storage apparatus 24 adjusts its energy management behavior automatically, the data storage apparatus 24 imposes particular safeguards to ensure that critical system processes and operations are not interrupted or significantly affected. For example, in connection with a backup utility, the resources for the backup utility may remain allocated regardless of the results and the intelligence programmed into the data storage apparatus 24 smartly groups processes by resource requirement (CPU and priority) to minimize the performance impact of any energy management settings on the backup utility.

Additionally, in some arrangements, the user of the data storage apparatus 24 is able to navigate and control power-related operation using an enhanced dashboard-style interface (e.g., a web-based interface, a graphical user interface via a user console of the data storage apparatus 24, etc.). In some arrangements, this dashboard-style interface is layered into multiple tiers, e.g., a top layer which provides a simple one gauge approach to adjusting rack level power efficiency, and an advanced layer for users with the power efficiency expertise and skills to operate more advanced management settings to finely tune and optimize the power consumption behavior of their data storage systems.

As described above, improved techniques are directed to overseeing data storage equipment power usage by locally collecting power consumption data 34 by the data storage equipment 24, and then sending that power consumption data 34 to a remote facility 26 for power consumption evaluation. Such collection of this power consumption data 34 may involve electronically taking measurements from a variety of data storage components (e.g., specialized power supply sensors, microprocessor states, and so on). Additionally, such operation can be performed routinely and in an automated manner to unburden the user. Furthermore, evaluation can be performed centrally at the remote facility 26 in a manner that enables meaningful equipment/operating-pattern comparisons to be drawn among multiple data storage arrays at different locations. Moreover, such evaluation at the remote facility frees the data storage equipment 24 from the need to locally consume power and processing cycles to perform the evaluation.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 such as the remote facility 26 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the above-described techniques are applicable to other computerized assemblies, devices, components, etc. where there is opportunity to improve power consumption performance. That is, the improved techniques offer advantages when the storage-related equipment is required to provide high availability along with efficient power performance. Such modifications and enhancements are intended to belong to various embodiments of the disclosure.

What is claimed is:

1. A method of overseeing data storage equipment power usage, the method comprising:
   acquiring, by data storage equipment, power consumption data while the data storage equipment performs host data storage input/output (IO) operations on behalf of a set of host computers during a power consumption time period;
   storing, by the data storage equipment, the power consumption data in a local database during the power consumption time period; and
   electronically providing, by the data storage equipment, the power consumption data from the local database to a remote power consumption analysis facility through a computerized communications medium to determine power consumption performance of the data storage equipment during the power consumption time period;

wherein the data storage equipment is constructed and arranged to log storage drive error events while performing the host data storage IO operations on behalf of the set of host computers; and wherein electronically providing the power consumption data from the local database to the remote power consumption analysis facility includes:

bundling the power consumption data and the storage drive error events into an aggregate data storage equipment performance package and sending the aggregate data storage equipment performance package to a remote data storage equipment support center, which includes the remote power consumption analysis facility, through the computerized communications medium for evaluation of both the power consumption data and the storage drive error events.

2. A method as in claim 1 wherein the data storage equipment includes a scheduler circuit; and wherein electronically providing the power consumption data from the local database to the remote power consumption analysis facility includes:

receiving a power consumption time period expiration signal from the scheduler circuit, the power consumption time period expiration signal indicating that the power consumption time period has expired, and transmitting the power consumption data from the local database to the remote power consumption analysis facility in response to the power consumption time period expiration signal.

3. A method as in claim 2 wherein the schedule circuit is constructed and arranged to output a new power consumption time period expiration signal each day to form a series of power consumption time period expiration signals; and wherein the method further comprises:

after transmitting the power consumption data from the local database to the remote power consumption analysis facility, providing a series of new power consumption data transmissions from the local database to the remote power consumption analysis facility once a day in response to the series of power consumption time period expiration signals.

4. A method as in claim 2 wherein acquiring the power consumption data includes:

recording, as at least some of the power consumption data, power supply measurements from power supply sensors of a set of power supplies of the data storage equipment during the power consumption time period.

5. A method as in claim 4 wherein the data storage equipment includes a set of central processing units (CPUs) to perform the host data storage IO operations; and wherein acquiring the power consumption data further includes:

logging, as at least some of the power consumption data, C-state data which describes C-state power mode history of the set of CPUs during the power consumption time period.

6. A method of overseeing data storage equipment power usage, the method comprising:

acquiring, by data storage equipment, power consumption data while the data storage equipment performs host data storage input/output (IO) operations on behalf of a set of host computers during a power consumption time period;

storing, by the data storage equipment, the power consumption data in a local database during the power consumption time period;

electronically providing, by the data storage equipment, the power consumption data from the local database to a remote power consumption analysis facility through a computerized communications medium to determine power consumption performance of the data storage equipment during the power consumption time period; and processing, by the remote power consumption analysis facility, the power consumption data to provide a set of power consumption results and storing the set of power consumption results in a power consumption repository.

7. A method as in claim 6, further comprising:

based on the set of power consumption results stored in the power consumption repository, generating a customer report which includes a set of change-of-operation recommendations to reduce power consumption by the data storage equipment.

8. A method as in claim 6, further comprising:

based on the set of power consumption results stored in the power consumption repository, generating a software developer report which includes energy usage results corresponding to particular software applications running on the data storage equipment to reduce power consumption by the data storage equipment.

9. A method as in claim 6, further comprising:

based on the set of power consumption results stored in the power consumption repository, generating a sales report which includes a set of power consumption comparisons among alternative data storage equipment products to reduce power consumption by the data storage equipment.

10. A method as in claim 6, further comprising:

based on a series of power consumption results stored in the power consumption repository from multiple power consumption time periods, generating a power consumption report to reduce power consumption by the data storage equipment.

11. A method as in claim 6 wherein a first data storage array and a second data storage array co-reside at a single data storage equipment installation site; and wherein processing the power consumption data to provide a set of power consumption results includes:

generating (i) first power consumption results describing power consumption by a first data storage array of the data storage equipment, and (ii) second power consumption results describing power consumption by a second data storage array of the data storage equipment, to provide power consumption results with data storage array granularity for the single data storage equipment installation site.

12. Data storage equipment, comprising:

a network interface constructed and arranged to connect to a computerized communications medium;

a set of storage drives to store host data on behalf of a set of host computers; and storage processing circuitry coupled to the network interface and the set of storage drives, the storage processing circuitry being constructed and arranged to:

acquire power consumption data while performing host data storage input/output (IO) operations using the set of storage drives on behalf of the set of host computers during a power consumption time period, store the power consumption data in a local database residing in the set of storage drives during the power consumption time period, and electronically provide the power consumption data from the local database to a remote power consumption analysis facility through the network interface to determine power consumption performance of the data storage equipment during the power consumption time period;

wherein the storage processing circuitry is constructed and arranged to log storage drive error events while performing the host data storage IO operations on behalf of the set of host computers; and wherein the storage processing circuitry, when electronically providing the power consumption data from the local database to the remote power consumption analysis facility, is constructed and arranged to:

bundle the power consumption data and the storage drive error events into an aggregate data storage equipment performance package and send the aggregate data storage equipment performance package to a remote data storage equipment support center, which includes the remote power consumption analysis facility, through the computerized communications medium for evaluation of both the power consumption data and the storage drive error events.

13. Data storage equipment as in claim 12, further comprising:

a scheduler circuit which is constructed and arranged to provide a power consumption time period expiration signal, the power consumption time period expiration signal indicating that the power consumption time period has expired;

wherein the storage processing circuitry, when electronically providing the power consumption data from the local database to the remote power consumption analysis facility, is constructed and arranged to transmit the power consumption data from the local database to the remote power consumption analysis facility in response to the power consumption time period expiration signal.

14. Data storage equipment as in claim 13 wherein the schedule circuit is constructed and arranged to output a new power consumption time period expiration signal each day to form a series of power consumption time period expiration signals; and wherein the storage processing circuitry is further constructed and arranged to:

after transmitting the power consumption data from the local database to the remote power consumption analysis facility, provide a series of new power consumption data transmissions from the local database to the remote power consumption analysis facility once a day in response to the series of power consumption time period expiration signals.

15. Data storage equipment, comprising:

a network interface constructed and arranged to connect to a computerized communications medium;

a set of storage drives to store host data on behalf of a set of host computers; and storage processing circuitry coupled to the network interface and the set of storage drives, the storage processing circuitry being constructed and arranged to:

acquire power consumption data while performing host data storage input/output (IO) operations using the set of storage drives on behalf of the set of host computers during a power consumption time period, store the power consumption data in a local database residing in the set of storage drives during the power consumption time period, and electronically provide the power consumption data from the local database to a remote power consumption analysis facility through the network interface to determine power consumption performance of the data storage equipment during the power consumption time period;

wherein the storage processing circuitry, when acquiring the power consumption data, is constructed and arranged to:

record, as at least some of the power consumption data, power supply measurements from power supply sensors of a set of power supplies of the data storage equipment during the power consumption time period.

16. Data storage equipment as in claim 15 wherein the storage processing circuitry includes a set of central processing units (CPUs) to perform the host data storage IO operations; and wherein the storage processing circuitry, when acquiring the power consumption data, is further constructed and arranged to:

log, as at least some of the power consumption data, C-state data which describes C-state power mode history of the set of CPUs during the power consumption time period.

17. A computer program product having a non-transitory computer readable medium which stores a set of instructions to overseeing data storage equipment power usage, the set of instructions, when carried out by computerized circuitry, causing the computerized circuitry to perform a method of:

acquiring power consumption data while the data storage equipment performs host data storage input/output (IO) operations on behalf of a set of host computers during a power consumption time period;

storing the power consumption data in a local database during the power consumption time period; and electronically providing the power consumption data from the local database to a remote power consumption analysis facility through a computerized communications medium to determine power consumption performance of the data storage equipment during the power consumption time period;

wherein the data storage equipment is constructed and arranged to log storage drive error events while performing the host data storage IO operations on behalf of the set of host computers; and wherein electronically providing the power consumption data from the local database to the remote power consumption analysis facility includes:

bundling the power consumption data and the storage drive error events into an aggregate data storage equipment performance package and sending the aggregate data storage equipment performance package to a remote data storage equipment support center, which includes the remote power consumption analysis facility, through the computerized communications medium for evaluation of both the power consumption data and the storage drive error events.

18. A computer program product as in claim 17 wherein the computerized circuitry includes a scheduler circuit; and wherein electronically providing the power consumption data from the local database to the remote power consumption analysis facility includes:

receiving a power consumption time period expiration signal from the scheduler circuit, the power consumption time period expiration signal indicating that the power consumption time period has expired, and transmitting the power consumption data from the local database to the remote power consumption analysis facility in response to the power consumption time period expiration signal.

19. A method of overseeing data storage equipment power usage, the method comprising:

acquiring, by data storage equipment, power consumption data while the data storage equipment performs host data storage input/output (IO) operations on behalf of a set of host computers during a power consumption time period;

storing, by the data storage equipment, the power consumption data in a local database during the power consumption time period; and electronically providing, by the data storage equipment, the power consumption data from the local database to a remote power consumption analysis facility through a computerized communications medium to determine power consumption performance of the data storage equipment during the power consumption time period;

wherein acquiring the power consumption data includes:

recording, as at least some of the power consumption data, power supply measurements from power supply sensors of a set of power supplies of the data storage equipment during the power consumption time period.

20. A computer program product having a non-transitory computer readable medium which stores a set of instructions to overseeing data storage equipment power usage, the set of instructions, when carried out by computerized circuitry, causing the computerized circuitry to perform a method of:

acquiring power consumption data while the data storage equipment performs host data storage input/output (IO) operations on behalf of a set of host computers during a power consumption time period;

storing the power consumption data in a local database during the power consumption time period; and electronically providing the power consumption data from the local database to a remote power consumption analysis facility through a computerized communications medium to determine power consumption performance of the data storage equipment during the power consumption time period;

wherein acquiring the power consumption data includes:

recording, as at least some of the power consumption data, power supply measurements from power supply sensors of a set of power supplies of the data storage equipment during the power consumption time period.

* * * * *